United States Patent [19]

Nishio et al.

[11] 4,079,952
[45] Mar. 21, 1978

[54] FILLER ASSEMBLY OF AN AUTOMOTIVE FUEL TANK

[75] Inventors: Hiroki Nishio; Hiroyuki Tanizaki, both of Yokohama, Japan

[73] Assignee: Nissan Motor Company, Ltd., Japan

[21] Appl. No.: 719,420

[22] Filed: Sep. 1, 1976

[30] Foreign Application Priority Data

Sep. 2, 1975  Japan ............................ 50-121641[U]

[51] Int. Cl.² ............................................. B65D 39/00
[52] U.S. Cl. .................................... 280/5 A; 296/1 C; 220/86 R; 220/88 R
[58] Field of Search ....................... 296/1 C; 280/5 A; 220/86 R, 88 R

[56] References Cited

U.S. PATENT DOCUMENTS

| | | | |
|---|---|---|---|
| 2,508,124 | 5/1950 | Stephenson | 220/86 R |
| 2,846,261 | 8/1958 | Nickles | 280/5 A |
| 3,856,316 | 12/1974 | Badberg | 280/5 A |

Primary Examiner—Richard A. Bertsch

[57] ABSTRACT

The diameter of a filler cap closing a filler tube is smaller than that of an opening of a filler cover secured to a rear side panel of a vehicle body, through which the filler tube extends outwardly. The filler cover is fastened to a filler neck flange fitted on the filler tube by means of headed screws which pass through spreadable slots formed in the filler cover and are fixed to the filler neck flange.

4 Claims, 3 Drawing Figures

FILLER ASSEMBLY OF AN AUTOMOTIVE FUEL TANK

This invention relates generally to an automotive fuel tank and particularly to an improvement to a filler assembly mounted to a body of a vehicle for replenishing the tank with fuel.

In many vehicles, inlets of filler tubes of fuel tanks are open to the outside through body rear side panels for fuel delivery into the fuel tank. Conventional filler assemblies are associated with shortcomings that filler caps are liable to be disengaged from the inlets of the filler tubes, when the rear side panel is highly deformed outboard as may occur in a rear-end collision of the vehicle.

It may therefore be a primary object of this invention to provide an improved filler assembly of fuel tank in which fitting of filler caps within filler tubes is not influenced by external force tending to deform the rear side panel outwardly, obviating a dangerous fuel outflow during the rear-end collision or the like. Another object of this invention is to provide a simple and economical filler assembly construction which achieves the above mentioned objects.

Other objects and advantages of this invention will be readily apparent as detailed explanation proceeds in connection with the accompanying drawings, in which.

Figure 1:
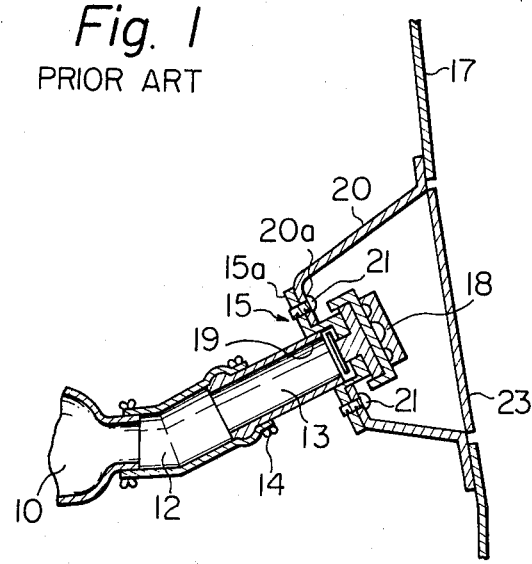
FIG. 1 is a section of a prior art filler assembly.

As shown in FIG. 1, a conventional filler assembly of a fuel tank 10 comprises a filler hose 12, preferably flexible, extending from the fuel tank 10 and a filler tube 13 having one end fitted within the filler hose 12, the tube and the hose being clamped together by a hose clamp 14. A filler neck 15 with a radial outward flange 15a is then fitted on the other end or inlet of the filler tube 13. There is provided a filler cover 20 secured to the inside surface of the body rear side panel 17 at a suitable space for facilitating fuel replenishing service. The filler cover 20 defines by its inward flange 20a an opening 19 through which the other end of the filler tube 13 together with the filler neck 15 extends outwardly of the filler cover. The flange 15a of the filler neck and the flange 20a of the filler cover are fastened together by headed screws 21. The extended end of the filler tube 13 is closed by a filler cap 18 which is to be removed from the tube inlet for re-charge of fuel into the fuel tank 10. The diameter of the filler cap 18 is greater than that of the opening 19 of the filler cover according to such prior art construction. The filler assembly is ordinarily covered by a hingedly movable lid 23 finished similarly as the rear side panel 17.

When the vehicle is severely bumped from behind, the rear side panel 17 is deformed to protrude outwardly. Consequently, an abnormal force tends to separate the filler cover 20 from the flange 15a of the filler neck, breaking the screws connecting the two flanges together. The flange 20a separated from the filler neck flange 15a then collides with the periphery of the filler cap 18, strongly pulling it outwardly. This will cause the filler cap 18 to be removed from the tube 13. As a result, fuel flows out from the fuel tank, probably causing a vehicle fire.

Besides, in the aforementioned construction of the filler assembly, a force tending to withdraw the filler tube from the filler hose is applied to the hose clamp 14. This also results in flowout of fuel from the tank 10.

Figure 3:
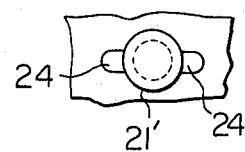
FIG. 3 is an elevation in an enlarged scale viewed in the arrow-indicated direction of FIG. 2.
Figure 2:
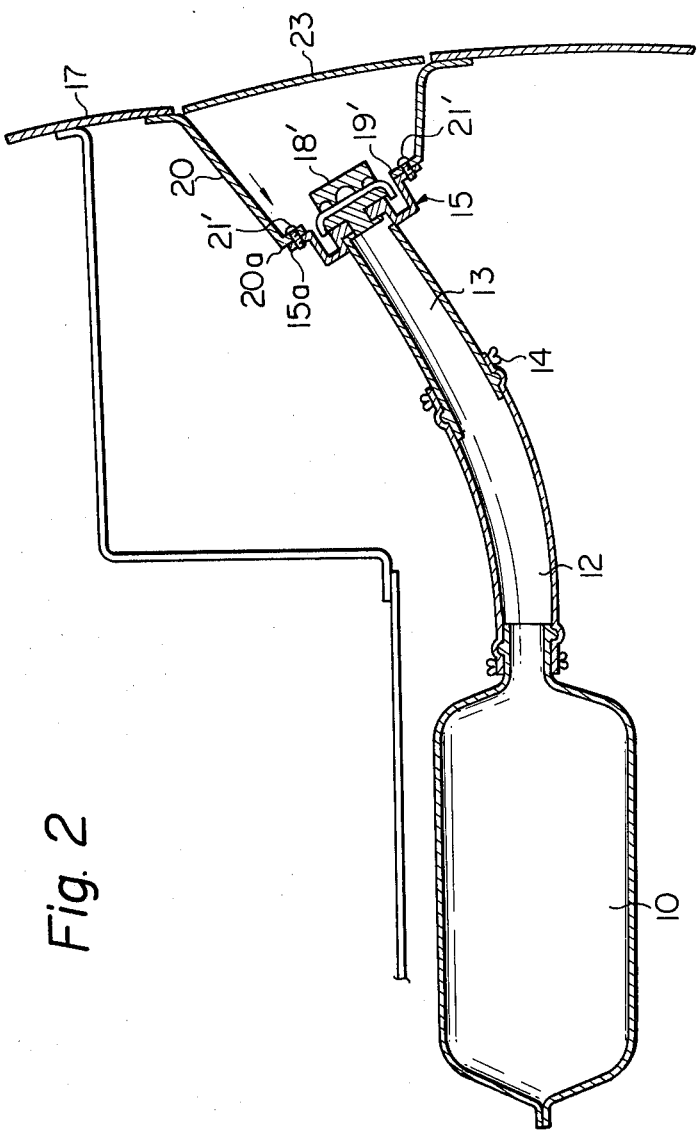
FIG. 2 is a section showing a preferred embodiment of a fuel tank filler assembly according to this invention.

A preferred embodiment of the filler assembly according to this invention, illustrated in FIGS. 2 and 3, obviates the aforementioned shortcomings of the conventional filler assembly. As shown, the diameter of the filler cap 18' in this embodiment is smaller than that of the opening 19' defined by the flange 20a of the filler cover. The flange 15a of the filler neck extends upwardly and then outwardly to define an opening (no numeral) matching the opening 19'. The two flanges 15a and 20a are releasably fastened together by several headed screws 21'. As best seen in FIG. 3, each screw is passed through an elongate slot 24 formed in the flange 20a and then fixedly screwed into the flange 15a. The width of the slot 24 is such that it usually prevents the head of screw from passing therethrough.

In operation, if the rear side panel is highly deformed outwardly, the filler cover 20 tends to be separated from the flange 15a by breaking the screws 21'. In this moment, the slots 24 are spread to such a degree passing the screw head therethrough so that the filler cover 20 is removed from the filler neck flange 15a without breaking the screw 21'. Since the diameter of the opening 19' is greater than that of the filler cap 18', the filler cover is deformed outwardly without touching the peripheral edge of the filler cap 18'. Fuel outflow is prevented even in a severe collision of the vehicle from behind, minimizing a damage to the vehicle and its occupants resulting from such collision.

Since, as described, the screw head is passed through the spread slot 24, an outwardly acting force influences only the filler cover fixed to the rear side panel, whereas the filler neck and therefore the filler tube is not subject to such external force. Withdrawal of the filler tube from the filler hose is therefore advantageously prevented by this way of fastening.

It will be readily understood from the above description that the preferred embodiment of this invention prevents fuel discharge from the fuel tank resulting from external force acting on the filler assembly of the tank for a rear-end collision or other causes. Moreover, this feature is obtained according to this invention by a simple construction of the filler assembly without any additional constituent part or element being required.

What is claimed is:

1. In a filler assembly of an automotive fuel tank having a filler tube with an outward end secured to and supported by a filler cover integral with an automotive body, the improvement comprising a filler neck mounted around the outward end of the filler tube and having a radial outward flange defining an opening through which the top end of the filler tube is passed, a filler cap removably closing the top end of the filler tube, the diameter of the filler cap being smaller than that of the opening defined by the radial flange of the filler neck, and means fastening the radial flange to the filler cover thereby allowing separation of the filler cover from the assembly without dislodging the filler cap when said body is subjected to rear-end impact.

2. A filler assembly according to claim 1, in which said fastening means comprises a plurality of headed screws each passing through a spreadable slot formed in the filler cover and fixed to said radial flange of the filler neck.

3. A filler assembly according to claim 2, in which said slot being spreaded to a degree passing a head of the screw therethrough when an external force is applied to the filler cover to separate the same from the radial flange.

4. A filler assembly according to claim 1, in which the filler tube is fitted in a filler hose leading from the fuel tank and is fastened thereto by a hose clamp.

* * * * *